United States Patent
Nakagawa

(10) Patent No.: US 11,403,085 B2
(45) Date of Patent: Aug. 2, 2022

(54) DATA COLLECTION SYSTEM, DATA COLLECTION METHOD, NON-TRANSITORY COMPUTER READABLE MEDIUM, AND EDGE-FUNCTIONALIZED DEVICE

(71) Applicant: FUJIFILM Business Innovation Corp., Tokyo (JP)

(72) Inventor: Tomoka Nakagawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 341 days.

(21) Appl. No.: 16/560,994

(22) Filed: Sep. 4, 2019

(65) Prior Publication Data

US 2020/0301687 A1  Sep. 24, 2020

(30) Foreign Application Priority Data

Mar. 22, 2019  (JP) .............................. JP2019-055682

(51) Int. Cl.
| | |
|---|---|
| *G06F 8/61* | (2018.01) |
| *H04L 61/5014* | (2022.01) |
| *H04L 67/00* | (2022.01) |
| *H04N 1/32* | (2006.01) |
| *H04L 67/12* | (2022.01) |

(52) U.S. Cl.
CPC ............ *G06F 8/61* (2013.01); *H04L 61/2015* (2013.01); *H04L 67/34* (2013.01); *H04L 67/12* (2013.01); *H04N 1/32561* (2013.01)

(58) Field of Classification Search
None
See application file for complete search history.

(56) References Cited

U.S. PATENT DOCUMENTS

| | | | |
|---|---|---|---|
| 2011/0078108 A1* | 3/2011 | Kumar | G06F 11/3006 707/E17.037 |
| 2015/0134612 A1* | 5/2015 | Silberstein | H04L 67/327 707/634 |
| 2019/0129372 A1* | 5/2019 | Shogaki | G05B 23/024 |
| 2019/0268501 A1* | 8/2019 | Nakagawa | H04L 67/1097 |
| 2019/0333129 A1* | 10/2019 | Taniguchi | G06Q 30/0633 |
| 2022/0080977 A1* | 3/2022 | Ucar | B60W 40/09 |

FOREIGN PATENT DOCUMENTS

JP  2007164679  6/2007

* cited by examiner

*Primary Examiner* — Philip Wang
(74) *Attorney, Agent, or Firm* — JCIPRNET

(57) ABSTRACT

A data collection system includes a first device that includes a generation unit configured to generate installation data including an edge-server function program for collecting data items generated by a device group including plural devices and a transmission unit configured to transmit the installation data generated by the generation unit to outside and a second device that includes an installation unit configured to install the edge-server function program by using the installation data transmitted from the first device. The second device selects one or more registration candidate devices by comparing first information that is further included in the installation data and second information that is acquirable separately from the installation data and attempts to register the one or more registration candidate devices as data collection targets when installation of the edge-server function program is completed by the installation unit.

12 Claims, 12 Drawing Sheets

| LOGIC ID | ANALYSIS PURPOSE | TYPE OF DEVICE | PERMISSION FLAG |
|---|---|---|---|
| 0001 | INTERCLOUD ... | MULTIFUNCTION MACHINE MOBILE TERMINAL | ON |
| 0002 | RATE PLAN ... | MOBILE TERMINAL | OFF |
| 0003 | POWER SAVING WITH MULTIFUNCTION MACHINE ... | ILLUMINANCE SENSOR MOTION DETECTOR | ON |

| TYPE OF DEVICE | DEVICE INFORMATION | COLLECTION PROTOCOL |
|---|---|---|
| MULTIFUNCTION MACHINE | PRODUCT W1, W2, W3 | SNMP |
| MOBILE TERMINAL | PRODUCT X1, X2, X3 | MQTT |
| ILLUMINANCE SENSOR | PRODUCT Y1, Y2, Y3 | Weave |
| MOTION DETECTOR | PRODUCT Z1, Z2, Z3 | HTTP |

| NETWORK INFORMATION | | DEVICE INFORMATION | | LEASE EXPIRATION DATE |
|---|---|---|---|---|
| IP ADDRESS | HOSTNAME | MAC ADDRESS | VENDOR CLASS ID | |
| 129.249.10.1 | XXXX | 111111 111111 | abcde12345 | yyyy-mm-dd |
| 129.249.10.2 | YYYY | 222222 222222 | fghij98765 | yyyy-mm-dd |
| 129.249.10.3 | ZZZZ | 333333 333333 | qwertyuiop | yyyy-mm-dd |

| DEVICE INFORMATION | NETWORK INFORMATION | COLLECTION PROTOCOL |
|---|---|---|
| MODEL NUMBER X1 | address-1 | MQTT |
| MODEL NUMBER Y2 | address-2 | Weave |
| MODEL NUMBER Z3 | address-3 | HTTP |

88

DATA COLLECTION SYSTEM, DATA COLLECTION METHOD, NON-TRANSITORY COMPUTER READABLE MEDIUM, AND EDGE-FUNCTIONALIZED DEVICE

CROSS-REFERENCE TO RELATED APPLICATIONS

This application is based on and claims priority under 35 USC 119 from Japanese Patent Application No. 2019-055682 filed Mar. 22, 2019.

BACKGROUND

(i) Technical Field

The present disclosure relates to a data collection system, a data collection method, a non-transitory computer readable medium, and an edge-functionalized device.

(ii) Related Art

Japanese Unexamined Patent Application Publication No. 2007-164679 discloses a so-called remote installation system that remotely installs software onto an installation target device in accordance with a request from a customer and that causes the device to operate as a web server.

For example, it is assumed that an edge server function is added to an existing device by performing remote installation of a program for implementing as "edge-server function program"). After completion of the installation, an operation of registering devices from each of which data is to be collected is performed, so that the existing device may begin operation as an edge server.

However, when trying to separately perform the remote installation operation and the device registration operation, since these operations are performed in different work areas, there may be a situation in which these operations are not performed in proper conjunction with each other. In some cases, the device registration operation is delayed, and as a result, it takes time to start the operation of the edge server.

SUMMARY

Aspects of non-limiting embodiments of the present disclosure relate to more smoothly performing, when an edge server function is installed, a series of installation operations to be performed so as to start the operation of an edge server than in the case where a remote installation operation and a device registration operation are separately performed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a data collection system including a first device that includes a generation unit configured to generate installation data including an edge-server function program for collecting data items generated by a device group including a plurality of devices and a transmission unit configured to transmit the installation data generated by the generation unit to outside and a second device that includes an installation unit configured to install the edge-server function program by using the installation data transmitted from the first device. The second device selects one or more registration candidate devices by comparing first information that is further included in the installation data and second information that is acquirable separately from the installation data and attempts to register the one or more registration candidate devices as data collection targets when installation of the edge-server function program is completed by the installation unit.

BRIEF DESCRIPTION OF THE DRAWINGS

An exemplary embodiment of the present disclosure will be described in detail based on the following figures, wherein:

FIGS. 9A and 9B are respectively a diagram illustrating an example of a data structure included in logic information and a diagram illustrating an example of a data structure included in protocol information;

FIG. 10 is a diagram illustrating an example of a data structure included in lease information;

DETAILED DESCRIPTION

A data collection system according to the present disclosure will be described using an exemplary embodiment with respect to its relationships between a data collection method, a data collection program, and an edge-functionalized device and with reference to the accompanying drawings. Note that, it is obvious that the present disclosure is not limited to the following exemplary embodiment and that changes may be freely made within the gist of the present disclosure. Alternatively, configurations may be arbitrarily combined with each other as long as there is no technical contradiction.

[Configuration of Data Collection System 10]
<Overall Configuration>

Figure 1:
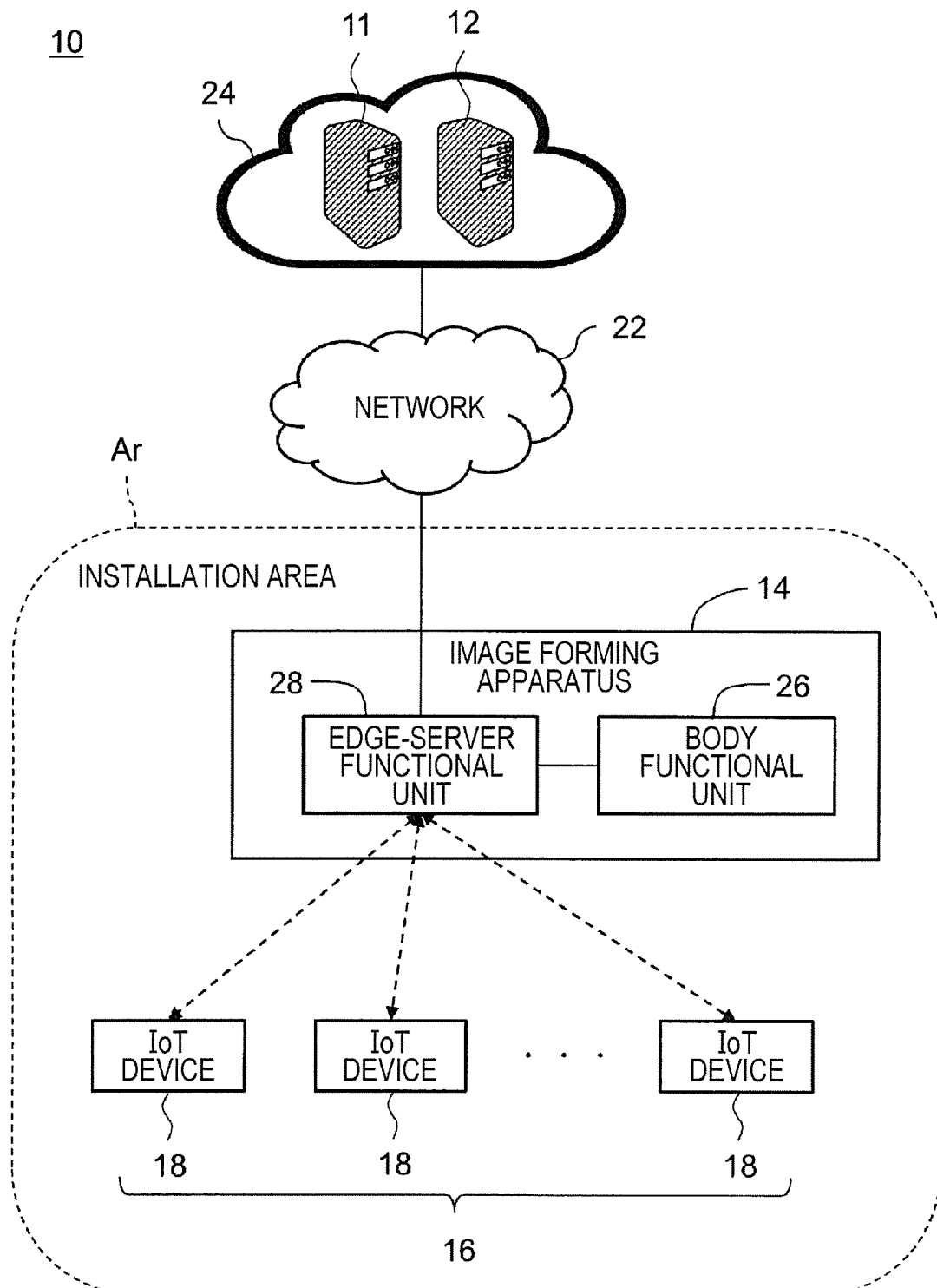
FIG. 1 is a diagram illustrating the overall configuration of a data collection system according to the exemplary embodiment of the present disclosure.

FIG. 1 is a diagram illustrating the overall configuration of a data collection system 10 according to an exemplary embodiment of the present disclosure. The data collection system 10 is a system configured to be capable of providing, in a composite manner, an "image formation service" for providing a user with an image-formed product in an installation area Ar and a "data collection service" for collecting and analyzing data items that are successively generated in the installation area Ar.

More specifically, the data collection system 10 includes a central server 11, an installation server 12 (corresponding to a "first device"), an image forming apparatus 14 that serves as an edge server (corresponding to a "third device"), and a device group 16 that includes a plurality of Internet of Things (IoT) devices 18. The image forming apparatus 14 and the device group 16 are arranged in the installation area Ar such as an office. The image forming apparatus 14 is configured to be capable of bidirectionally communicating with the central server 11 or the installation server 12 via a network 22. Note that, although only the single image forming apparatus 14 is illustrated in FIG. 1, a plurality of image forming apparatuses 14 may be arranged in the single installation area Ar. In addition, although only the single installation area Ar is illustrated in FIG. 1, there may be another installation area different from the installation area Ar.

The central server 11 includes one or more server computers on a cloud 24. The central server 11 collects data items from the image forming apparatus 14, which serves as an edge server, and performs various processing operations for using these data items. Note that the central server 11 may be a cloud-type server (a so-called cloud server) or may be an on-premises server.

The installation server 12 includes one or more server computers on the cloud 24. The installation server 12 performs various processing operations for remotely installing various software for performing the data collection service. Note that the installation server 12 may be a cloud server or may be an on-premises server. In addition, in the case illustrated in FIG. 1, although the installation server 12 is a device that is different from the central server 11, the installation server 12 may be the same device as the central server 11.

The image forming apparatus 14 is a digital multifunction machine (a so-called multifunction printer (MFP)) that executes at least one of a printer function, a copy function, a scan function, a facsimile function, and a data transmission function. The image forming apparatus 14 includes a body functional unit 26 that serves a function that is related to the "image formation service" and an edge-server functional unit 28 that serves a function that is related to the "data collection service".

Note that the edge server is not limited to having a device configuration in which the edge-server functional unit 28 is added to the image forming apparatus 14. For example, the edge-server functional unit 28 may be included in one of various devices each of which is different from the image forming apparatus 14 and each of which includes another body functional unit or may be formed of a dedicated device that has only an edge server function.

Each of the IoT devices 18 is a device that has a generation function of generating data items as various functions of the device are exhibited and a communication function of transmitting generated data items to the outside by wired or wireless communication. Each of the IoT devices 18 may be a stationary device (e.g., a computer device, a communication device, an office device, an illumination device, an air conditioner, or a measuring device) that is located in the installation area Ar or may be a transportable device (e.g., a laptop computer, a tablet terminal, a smartphone, a wearable device) that may be brought into the installation area Ar. Note that the image forming apparatus 14, which includes the body functional unit 26, may be considered as one of the IoT devices 18.

Figure 2:
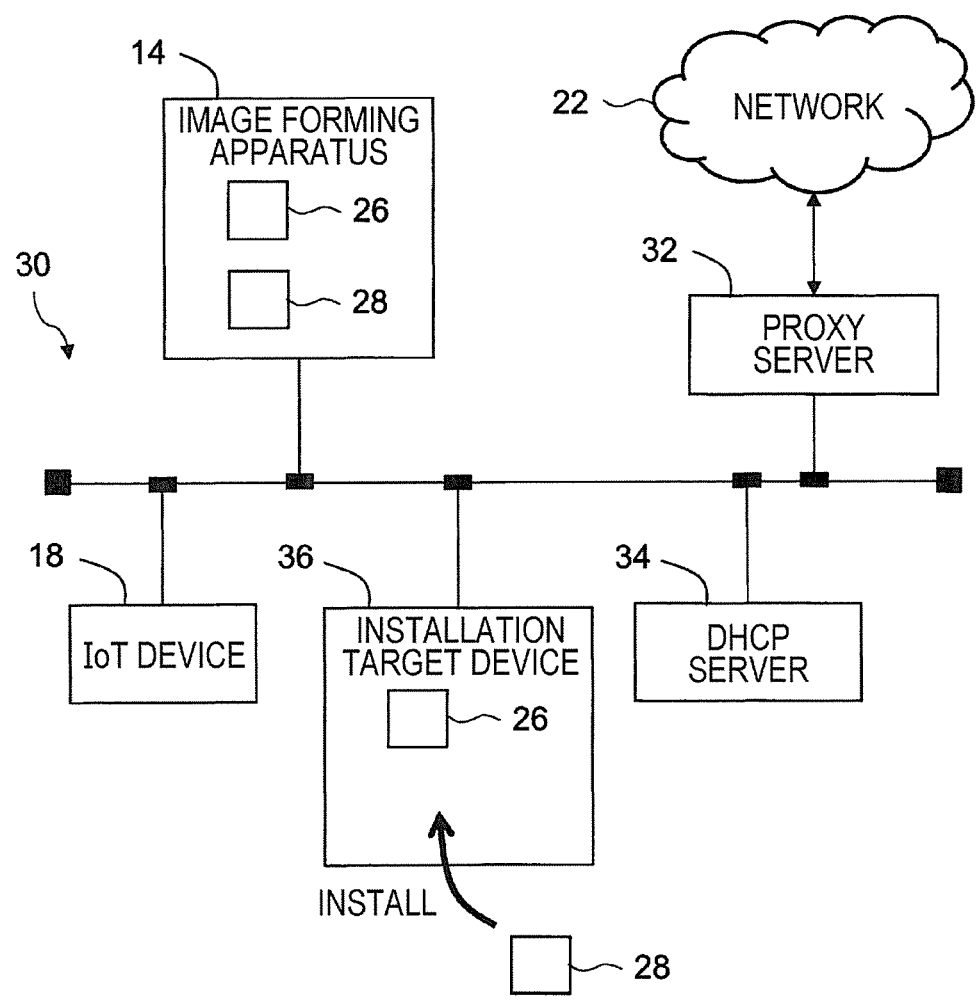
FIG. 2 is a diagram illustrating a network configuration in an installation area illustrated in FIG. 1.

FIG. 2 is a diagram illustrating a network configuration in the installation area Ar illustrated in FIG. 1. A local area network (hereinafter referred to as LAN 30) is constructed in the installation area Ar. The image forming apparatus 14, the IoT devices 18, a proxy server 32, a dynamic host configuration protocol (DHCP) server 34, and an installation target device 36 (corresponding to a "second device") are connected to the LAN 30.

The proxy server 32 is a server that perform communication with external devices including the central server 11 and the installation server 12 on behalf of the various devices connected to the LAN 30. The DHCP server 34 is a server that provides the devices in the LAN 30 with network setting information and manages the network setting information. Note that the installation target device 36 is different from the image forming apparatus 14 in that the installation target device 36 does not include the edge-server functional unit 28.

<Electrical Block Diagram of Image Forming Apparatus 14>

Figure 3:
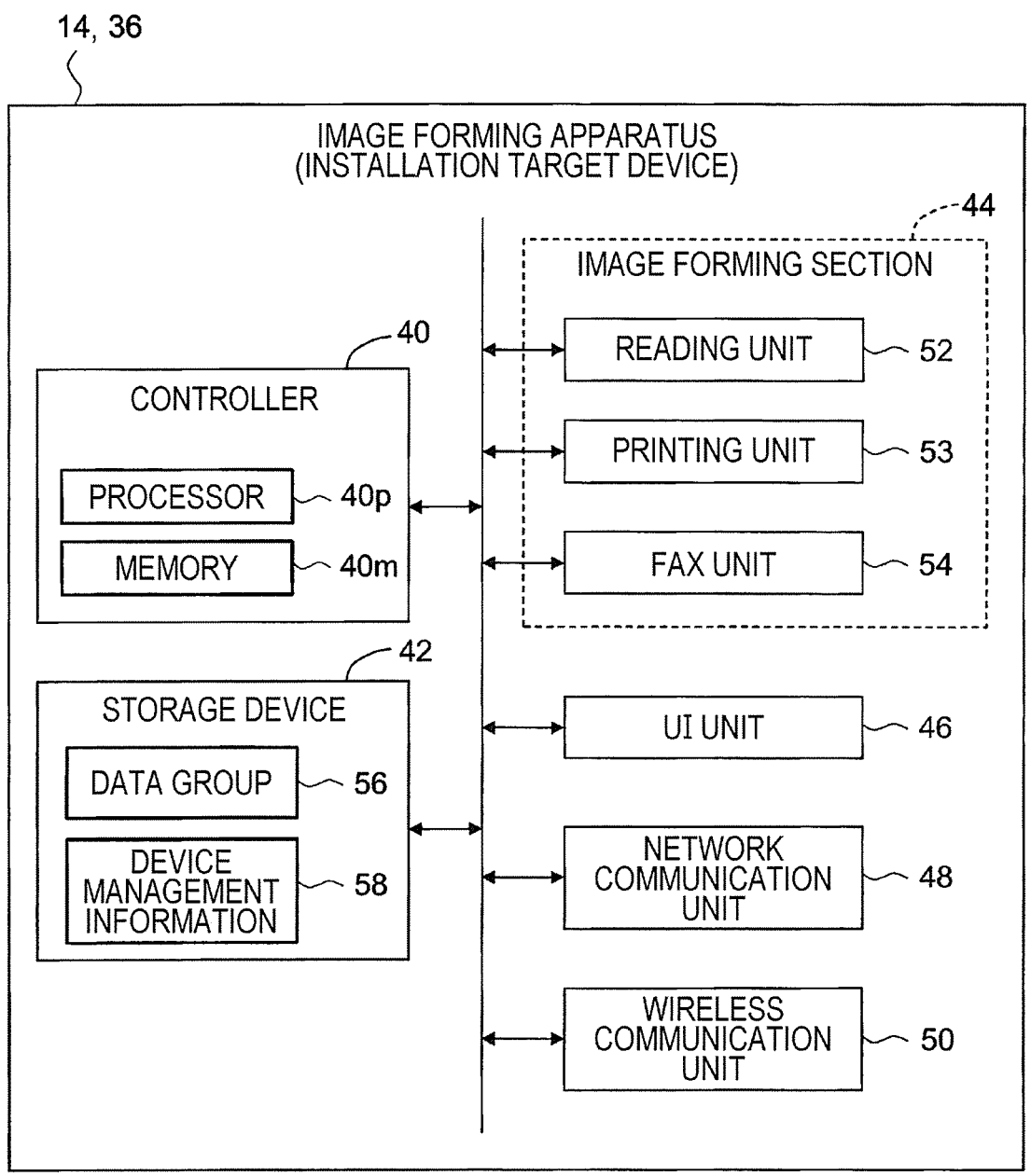
FIG. 3 is an electrical block diagram of an image forming apparatus illustrated in FIG. 1 and FIG. 2.

FIG. 3 is an electrical block diagram of the image forming apparatus 14 illustrated in FIG. 1 and FIG. 2. Note that the installation target device 36 (illustrated in FIG. 2) has a block configuration the same or substantially the same as that illustrated in FIG. 3. The image forming apparatus 14 includes a controller 40, a storage device 42 (corresponding to a memory unit), an image forming section 44, a user interface unit (hereinafter referred to as UI unit 46), a network communication unit 48, and a wireless communication unit 50.

The image forming section 44 includes a reading unit 52 that reads a sheet and generates image data, a printing unit 53 that outputs a printed material based on image data, and a FAX unit 54 that performs transmission and reception of a facsimile. For example, the UI unit 46 includes a touch-panel display and a hardware button and receives an input operation from a user.

The network communication unit 48 is a communication module that is used for performing network communication with external devices including the central server 11 and the installation server 12. The wireless communication unit 50 is a communication module that is used for performing wireless communication with external devices including the IoT devices 18. The term "wireless communication" includes not only narrowly-defined wireless communication using radio waves but also a space optical communication using spatial light (specifically, infrared communication or visible light communication).

The controller 40 includes a processor 40p and memory 40m and is a device that integrally controls each unit of the image forming apparatus 14. The processor 40p is a processing unit including a central processing unit (CPU)) and a microprocessing unit (MPU). The memory 40m is a non-transitory computer readable storage medium.

For example, the storage device 42 includes a hard disk drive (HDD) or a solid state drive (SSD) and stores various data items that are handled by the image forming apparatus 14. Regarding the image forming apparatus 14, which includes the edge-server functional unit 28 (illustrated in FIG. 1), the storage device 42 stores a data group 56 and device management information 58, each of which will be described later.

<Electrical Block Diagram of Installation Server 12>

Figure 4:
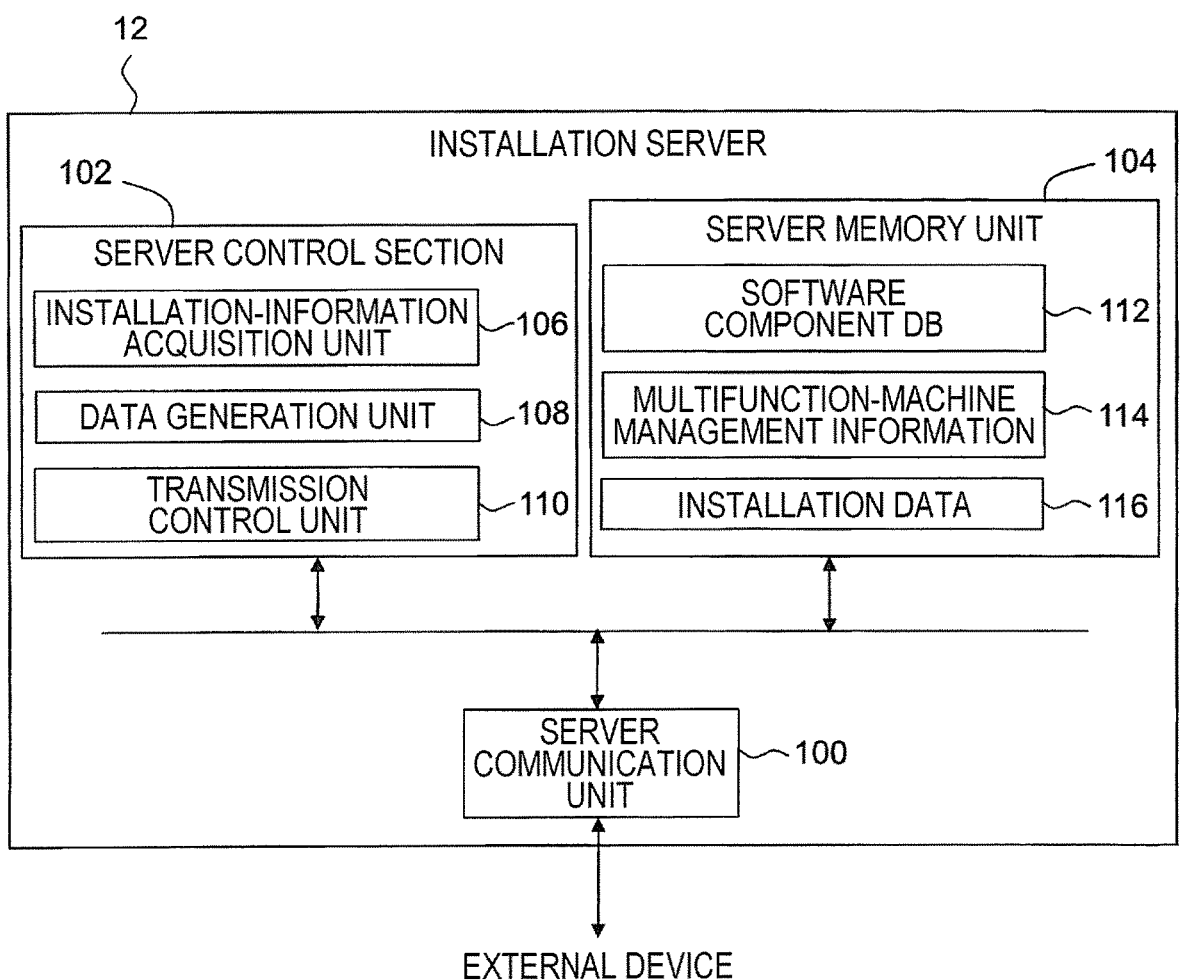
FIG. 4 is an electrical block diagram of an installation server illustrated in FIG. 1.

FIG. 4 is an electrical block diagram of the installation server 12 illustrated in FIG. 1. The installation server 12 includes a server communication unit 100 (corresponding to a "transmission unit"), a server control section 102, and a server memory unit 104.

The server communication unit 100 is a communication interface that is used for transmitting and receiving an electric signal to and from an external device. The server communication unit 100 enables the installation server 12 to provide the image forming apparatus 14 or the installation target device 36 with installation data 116 via the network 22.

The server control section 102 is formed of a processing unit including a CPU and an MPU. The server control section 102 reads and runs remote installation programs stored in the server memory unit 104 so as to function as an installation-information acquisition unit 106, a data generation unit 108 (corresponding to a "generation unit"), and a transmission control unit 110.

The server memory unit 104 is formed of a non-transitory computer readable storage medium. In the case illustrated in FIG. 4, a database regarding software components (hereinafter referred to as software component DB 112) is constructed in the server memory unit 104. In addition, a multifunction-machine management information 114 that is used for managing a multifunction machine and the installation data 116 that is customized in accordance with the installation target device 36 are stored in the server memory unit 104.

[Operation of Data Collection System 10]

The data collection system 10 according to the present exemplary embodiment is configured in the manner described above. The operation of the data collection system 10 (more specifically, a collection enabling operation) will now be described with reference to the flowcharts illustrated in FIG. 5 and FIG. 11. Here, the term "collection enabling operation" refers to a series of operations to be performed so as to enable the installation target device 36 to collect data items from the device group 16 through remote installation.

Figure 5:
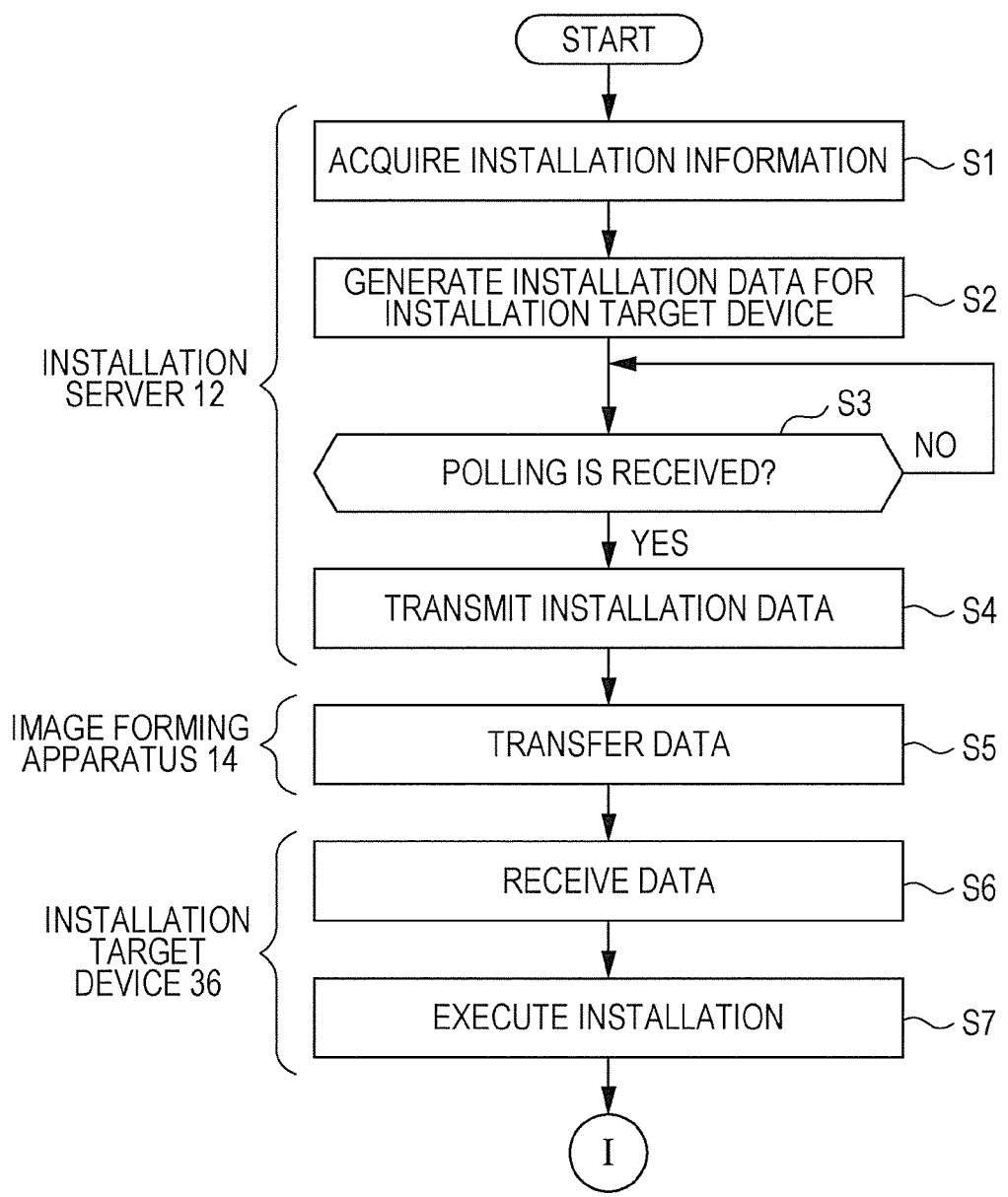
FIG. 5 is a first flowchart illustrating the operation of the data collection system.

In step S1 in FIG. 5, the server control section 102 of the installation server 12 (more specifically, the installation-information acquisition unit 106) acquires information required for remote installation (hereinafter referred to as "installation information"). The installation information includes, for example, information that indicates the contents of the data collection service (hereinafter referred to as "service information") and information that is required for transmission of the installation data 116 (hereinafter referred to as "transmission information").

Figure 6:
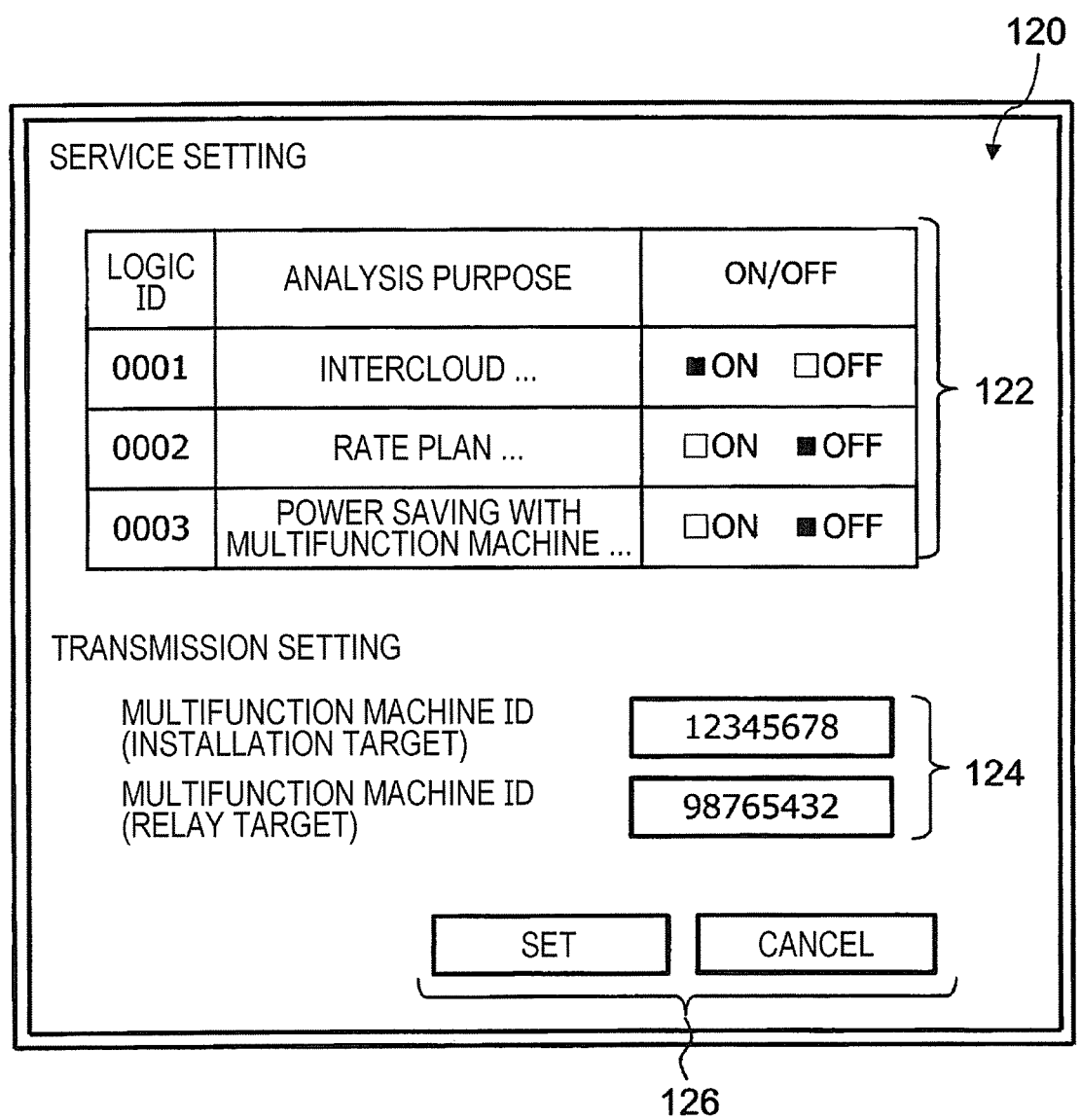
FIG. 6 is a diagram illustrating an example of a setting screen of remote installation.

FIG. 6 is a diagram illustrating an example of a setting screen 120 of remote installation. For example, the setting screen 120 is displayed on a display unit of an operator terminal (not illustrated). In the setting screen 120, a setting field 122 that is related to the service information, a setting field 124 that is related to the transmission information, and a button group 126 that includes [set] and [cancel] are arranged from an upper side to a lower side of the setting screen 120.

The setting field 122 includes a user control with which it may be set whether to permit collection and use of data. An operator may select whether to install an analysis program (hereinafter referred to as "analysis logic L") for performing analysis processing according to the usage purpose of data via the setting field 122. Examples of the usage purpose of data are as follows: [1] to determine the usage states of a mobile terminal and a multifunction machine and to propose an intercloud solution appropriate to the environment in which the mobile terminal and the multifunction machine are used by a customer, [2] to determine the usage state of a mobile terminal and to propose the best rate plan appropriate to the environment in which the mobile terminal is used by a customer, and [3] to determine the usage state of lighting and to propose a control method for saving the power that would be used by a multifunction machine, the method being appropriate to the environment in which the lighting is used by a customer.

The setting field 124 includes a user control that enables text input of identification information of a multifunction machine (hereinafter referred to as "multifunction machine ID"). An operator may input the multifunction machine ID (hereinafter referred to as "installation target ID") of the installation target device 36, which is an installation target, and the multifunction machine ID (hereinafter referred to as "relay target ID") of the image forming apparatus 14, which is a relay target, via the setting field 124.

An operator performs all the setting operations on the setting screen 120 while referring to installation information acquired beforehand from a system administrator of the installation area Ar. After that, the operator taps the "set" button in the button group 126. Then, the installation-information acquisition unit 106 acquires permission flags, each of which corresponds to one of logic IDs, as the "installation information" and acquires two multifunction machine IDs as the "transmission information".

In step S2, the server control section 102 (more specifically, the data generation unit 108) generates the installation data 116 for the installation target device 36 by using the installation information acquired in step S1. Before the installation data 116 is generated, the data generation unit 108 refers to the software component DB 112 and acquires variable data of the installation target device 36 corresponding to the service information, examples of the variable data including, for example, one or more analysis logics L, logic information 82, protocol information 84, and protocol usage data 86 (see FIG. 7).

Then, the data generation unit 108 generates the installation data 116, which is customized, by combining fixed data including an edge-server function program P and the above-mentioned variable data. Subsequently, the installation data 116 is temporarily stored together with the above-mentioned transmission information in the server memory unit 104.

Note that the installation data 116 generated by the installation server 12 may be directly transmitted as is to the installation target device 36 by the installation server 12. However, there is a possibility that direct exchange of the installation data 116 may not be performed because of, for example, the setting state of a firewall constructed in the proxy server 32 (illustrated in FIG. 2) or incompatibility with push-based communication (i.e., compatibility only with pull-based communication). Accordingly, the present exemplary embodiment pays attention to usage of the existing image forming apparatus 14, which is in the same installation area Ar as the installation target device 36 is.

In step S3, the server control section 102 checks if polling has been received from the image forming apparatus 14. When the polling has not yet been received (NO in step S3), the process remains in step S3. In contrast, when the polling has been received (YES in step S3), the process continues to step S4.

In step S4, the installation server 12 transmits, in response to the polling received in step S3, the installation data 116 generated in step S2 toward the image forming apparatus 14. Before this transmission, the server control section 102 (more specifically, the transmission control unit 110) extracts the multifunction machine ID of the image forming apparatus 14 included in a communication signal of the polling. After that, the transmission control unit 110 identifies the image forming apparatus 14 by reading and referring to the multifunction-machine management information 114. Then, the transmission control unit 110 performs transmission control for reading and transmitting the installation data 116 that corresponds to the multifunction machine ID of the image forming apparatus 14. As a result, the installation data 116 is transmitted toward the image forming apparatus 14 in the installation area Ar via the server communication unit 100.

In step S5, the image forming apparatus 14 receives the installation data 116 transmitted in step S4 and then transfers the installation data 116 to the installation target device 36. More specifically, the image forming apparatus 14 acquires the installation target ID that is transmitted with the installation data 116 and transmits the installation data 116 to the installation target device 36 by using an IP address that corresponds to the installation target ID.

In step S6, the installation target device 36 receives and acquires, via the network communication unit 48 thereof, the installation data 116 transferred from the image forming apparatus 14 in step S5. Then, the installation data 116 is temporarily stored in the storage device 42.

In step S7, a controller 40a of the installation target device 36 executes, by using the installation data 116 received in step S6, the installation of the edge-server function program P for collecting data items generated by the device group 16.

Figure 7:
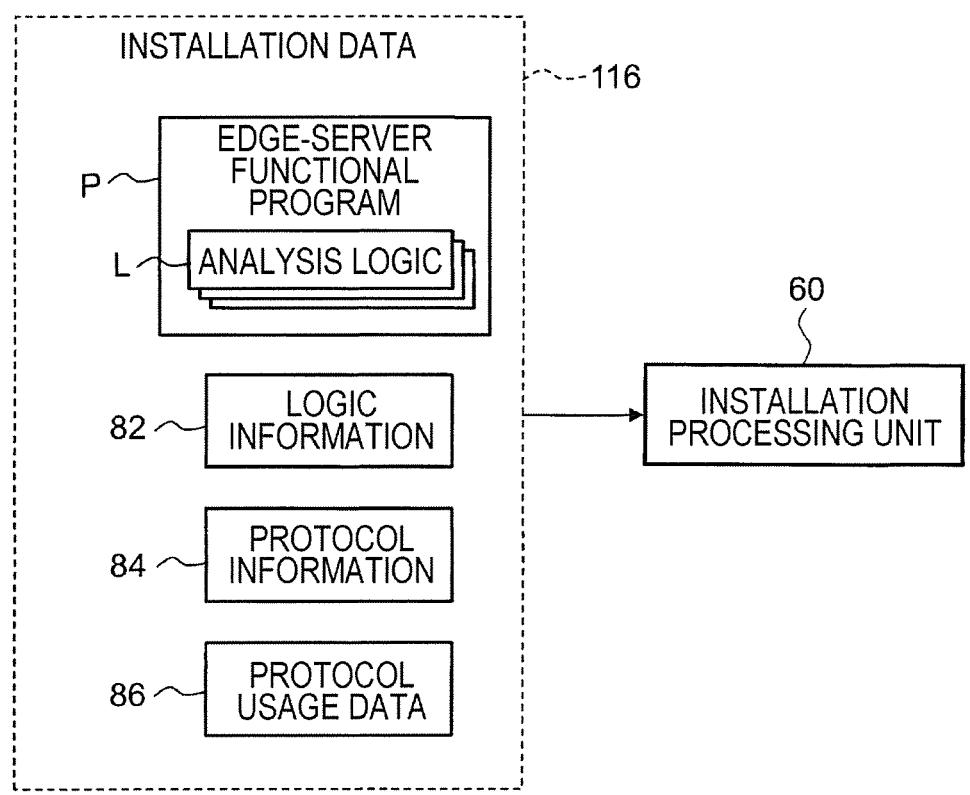
FIG. 7 is a functional block diagram of a controller at a first point-in-time.

FIG. 7 is a functional block diagram of the controller 40a at a first point-in-time. The term "first point-in-time" corresponds to a point in time immediately before the edge-server function program P is installed. The controller 40a functions as an installation processing unit 60 (an installation unit) that executes the installation of the edge-server function program P by using the installation data 116. The installation data 116 includes the edge-server function program P including the one or more analysis logics L the logic information 82, the protocol information 84, and the protocol usage data 86.

Figure 8:
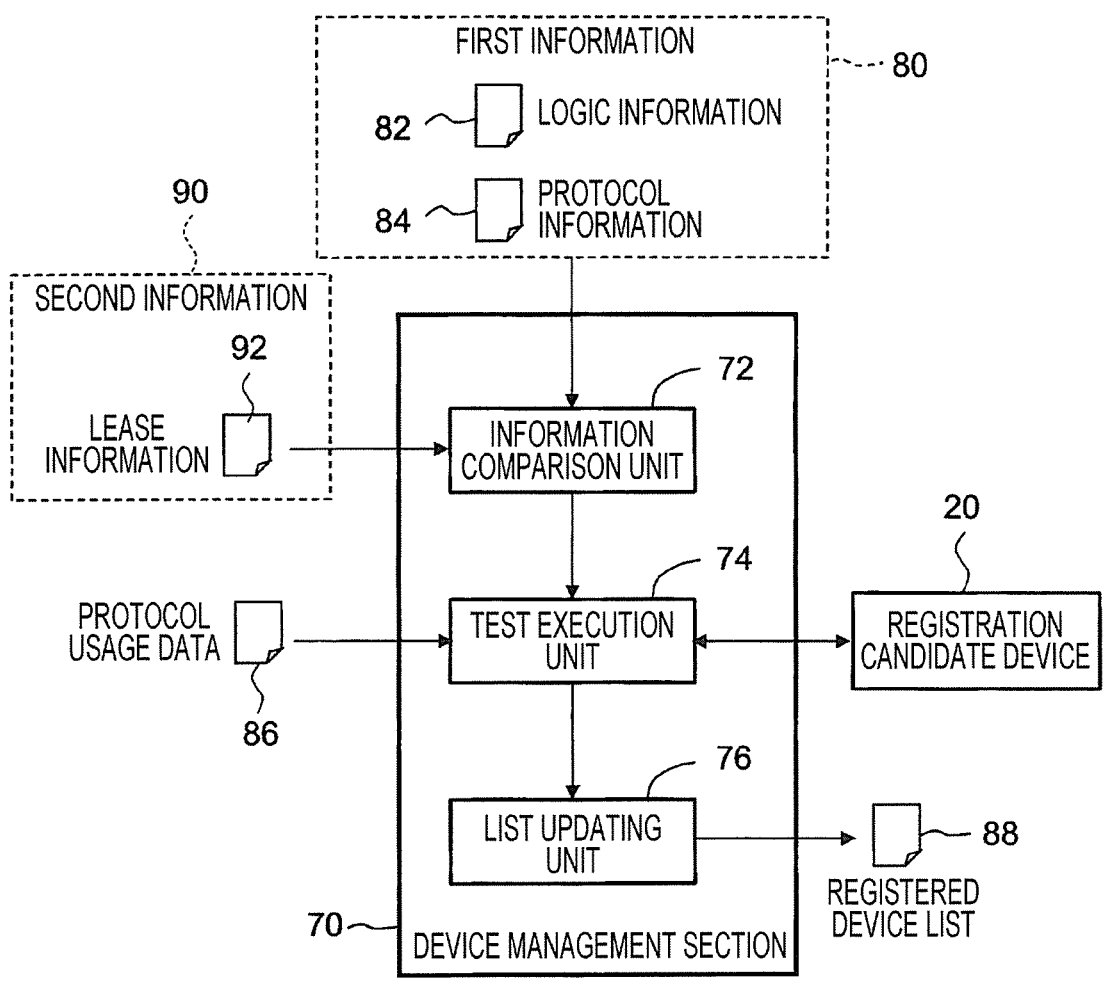
FIG. 8 is a functional block diagram of another controller at a second point-in-time.

FIG. 8 is a functional block diagram of a controller 40b at a second point-in-time. The term "second point-in-time" corresponds to a point in time immediately after the edge-server function program P has been installed. The controller 40b functions as a device management section 70 (corresponding to a "device management unit") that performs registration processing that is related to the IoT devices 18, from each of which data is to be collected. More specifically, the device management section 70 includes an information comparison unit 72, a test execution unit 74, and a list updating unit 76.

First information 80 is information included in the installation data 116 and indicates the IoT devices 18 that may generate data that is permitted to be used. In the case illustrated in FIG. 8, although the first information 80 is formed of a combination of the logic information 82 and the protocol information 84, the first information 80 may have a different data structure.

FIG. 9A is a diagram illustrating an example of a data structure included in the logic information 82. The logic information 82 includes table data that represents the correspondence relationships among "logic ID" that indicates identification information of the analysis logic L, "analysis purpose" that indicates the purpose of analysis, "type of device" that indicates the types of the IoT devices 18, and "permission flag" that indicates a permitted or prohibited state regarding data collection. Here, although the "logic ID" and the "analysis purpose" are associated with each other in a one-to-one relationship, their correspondence relationship is not limited to this and may be a one-to-many relationship, a many-to-one relationship, or a many-to-many relationship.

The "type of device" is classified in accordance with a predetermined classification regarding, for example, functions, applications, or general names. For example, the IoT devices 18 may be classified in accordance with a "large classification" including computer equipment, office equipment, and lighting equipment, or a "medium classification" including multifunction machine, smartphone, and wearable terminal.

FIG. 9B is a diagram illustrating an example of a data structure included in the protocol information 84. The protocol information 84 includes table data that represents the correspondence relationships among type of device, which has been mentioned above, device information, and collection protocol. Here, the "device information" is information with which each of the IoT devices 18 may be identified or classified and includes, for example, a product model number, a MAC address, and a DHCP option 60 (i.e., a vendor class ID). The "collection protocol" is a communication protocol that is used when data items are collected and includes, for example, MQTT, AMQP, CoAP, HTTP, SNMP, Weave, and Websocket.

Returning to FIG. 8, second information 90 is information that may be acquired separately from the installation data 116 and indicates the IoT devices 18 whose network information items are registered and managed in the LAN 30 where the installation target device 36 is available for use. In the case illustrated in FIG. 8, although the second information 90 is formed of lease information 92 that is held by the DHCP server 34, the second information 90 may have a different data structure.

FIG. 10 is a diagram illustrating an example of a data structure of the lease information 92. The lease information 92 includes table data that represents the correspondence relationships among network information, device information, and lease expiration date. In the case in FIG. 10, an IP address and a hostname are illustrated as the network information, and a MAC address and a vendor class ID are illustrated as the device information. Note that "lease expiration date" indicates the expiration date for each of the IoT devices 18 to use the network information allocated thereto.

The lease information 92 is acquired either before, during or immediately after the installation of the edge-server function program P. For example, a system administrator may perform a setting operation for storing the lease information 92 into the storage device 42 before the data collection system 10 starts the collection enabling operation. Alternatively, the installation target device 36 may request provision of the lease information 92 upon receiving the installation data 116 and may acquire the lease information 92 from the DHCP server 34.

Figure 11:
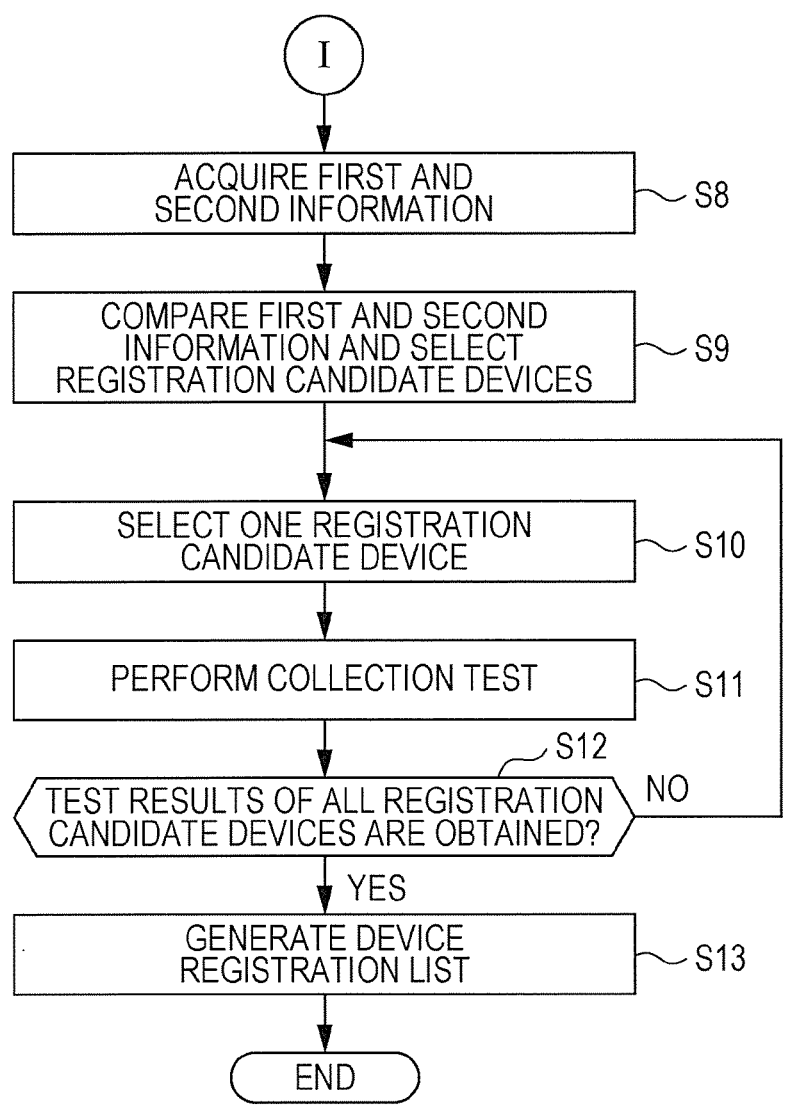
FIG. 11 is a second flowchart illustrating the operation of the data collection system.

In step S8 in FIG. 11, the device management section 70 (more specifically, the information comparison unit 72) reads and acquires the first information 80 and the second information 90 from the storage device 42 during or after execution of the installation in step S7.

In step S9, the information comparison unit 72 compares the first information 80 and the second information 90 acquired in step S8 and selects one or more of the IoT devices 18 in accordance with the comparison result. More specifically, the information comparison unit 72 excludes all the logic IDs whose "permission flag" is OFF in the logic information 82 and determines whether there is the IoT device 18 in which [1] the "type of device" in the logic information 82 and the "type of device" in the protocol information 84 match each other or are similar to each other and in which [2] the "device information" in the protocol information 84 and the "device information" in the lease information 92 match each other or are similar to each other.

In other words, the information comparison unit 72 determines the presence or absence of the IoT device 18 that simultaneously satisfies two conditions, which are [1] to be capable of generating data that is permitted to be used and [2] to have the network information that is registered and managed in the installation area Ar of the installation target device 36. One or more of the IoT devices 18 selected in step S9 will hereinafter be referred to as "registration candidate devices 20".

Then, upon completion of the installation of the edge-server function program P, the process continues to step S10. The timing at which the process continues to step S10 may be immediately after the installation has been completed or may be after a standby time has elapsed from the point in time at which the installation is completed. The standby time may be set by, for example, a setting operation performed on the setting screen 120 (illustrated in FIG. 6) or may be automatically set in accordance with the operating state of the installation target device 36.

In step S10, the test execution unit 74 specifies one of the one or more registration candidate devices 20 selected in step S9, the one having not yet been undergone the registration processing.

In step S11, the test execution unit 74 performs registration processing for attempting to register the registration candidate device 20 specified in step S10 as a data collection target. More specifically, the test execution unit 74 reads the protocol usage data 86 for using the collection protocol and performs a data collection test on the registration candidate device 20 in accordance with the collection protocol suitable for the registration candidate device 20. The data collection test may be a connectivity test for simply checking if communication is performable or may be a field test for checking if data collection is performable.

In step S12, the test execution unit 74 determines whether results of collection tests performed on all the registration candidate devices 20 have been obtained. When all the results have not yet been obtained (NO in step S12), the process returns to step S10, and step S10 to step S12 are sequentially repeated. In contrast, when all the results have been obtained (YES in step S12), the process continues to step S13.

In step S13, the list updating unit 76 newly generates a registered device list 88 on the basis of the results of the collection tests performed in step S11. Here, the list updating unit 76 performs, in accordance with the format of the registered device list 88, processing for writing various information items that are related to the registration candidate devices 20 that have passed the data collection test.

Figures 12, 13:
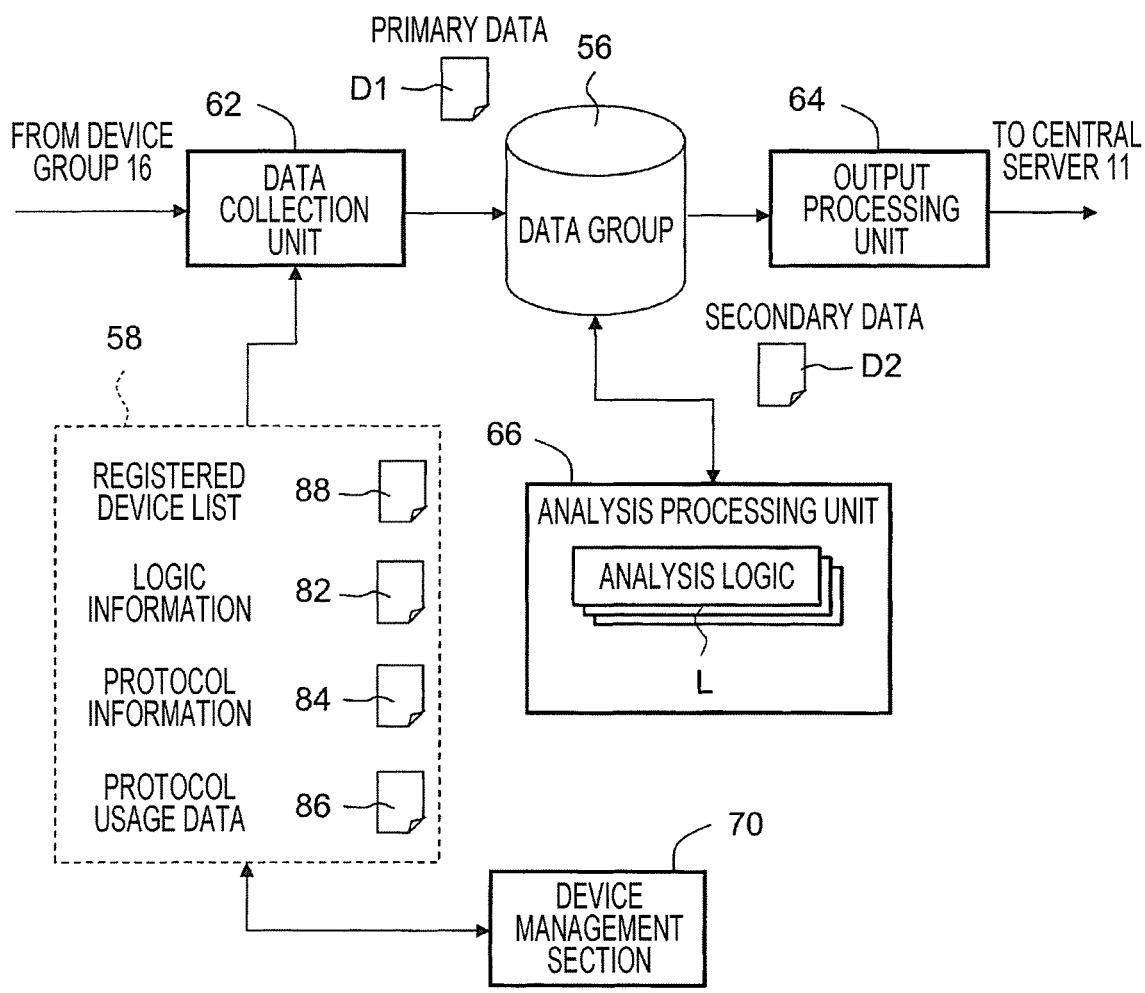
FIG. 12 is a diagram illustrating an example of a data structure included in a registered device list.
FIG. 13 is a functional block diagram of another controller at a third point-in-time.

FIG. 12 is a diagram illustrating an example of a data structure included in the registered device list 88. The registered device list 88 includes table data that represents the correspondence relationships among device information, network information, and collection protocol.

The collection enabling operation performed by the data collection system 10 is completed in the manner described above. As a result, the installation target device 36 acquires an edge server function through remote installation and starts a desired data collection service without requiring an operator to perform an operation of registering the IoT devices 18.

FIG. 13 is a functional block diagram of a controller 40*c* at a third point-in-time. The term "third point-in-time" corresponds to a point in time after automatic registration of the IoT devices 18 has been performed. The controller 40*c* functions as a data collection unit 62, an output processing unit 64, an analysis processing unit 66, and the device management section 70.

The data collection unit 62 collects data (hereinafter also referred to as "primary data D1") generated by the plurality of IoT devices 18 listed in the registered device list 88, that is, the device group 16. The data collection unit 62 temporarily stores the primary data D1, which is regularly or irregularly collected thereby, into the storage device 42 (illustrated in FIG. 3) while the primary data D1 is associated with the device information of the IoT devices 18.

The output processing unit 64 performs desired output processing (e.g., data encryption or generation of data to be transmitted) on at least part of data in the data group 56 and outputs the obtained data to be transmitted toward the central server 11. The analysis processing unit 66 performs processing for analyzing the primary data D1 in accordance with the one or more analysis logics L and outputs secondary data D2 that includes results of the analysis. The device management section 70 manually or automatically performs registration processing that is related to the IoT devices 18, from each of which data is to be collected.

SUMMARY

As described above, the installation server 12 (first device) of the data collection system 10 includes the data generation unit 108 (generation unit) that generates the installation data 116 including the edge-server function program P for collecting data items generated by the device group 16, which includes the plurality of IoT devices 18 (devices), and the server communication unit 100 (transmission unit) that transmits the generated installation data 116 to the outside.

The installation target device 36 (second device, edge-functionalized device) of the data collection system 10 includes the installation processing unit 60 (installation unit) that installs the edge-server function program P by using the installation data 116 transmitted from the installation server 12. The installation target device 36 selects one or more of the registration candidate devices 20 by comparing the first information 80, which is further included in the installation data 116, and the second information 90, which may be acquired separately from the installation data 116, and attempts to register the one or more registration candidate devices 20 as data collection targets when the installation of the edge-server function program P is completed by the installation processing unit 60.

In addition, in the data collection method and the data collection program, the installation server 12 performs a generation step (step S2 in FIG. 5) of generating the installation data 116 including the edge-server function program P and a transmission step (step S4) of transmitting the generated installation data 116 to the outside. Then, the installation target device 36 performs an installation step (step S7) of installing the edge-server function program P, a selection step (step S9 in FIG. 11) of selecting one or more of the registration candidate devices 20 by comparing the first information 80 and the second information 90, and a device management step (step S11) of attempting to register the registration candidate devices 20 as data collection targets upon completion of the installation of the edge-server function program P.

As described above, the installation target device 36 executes installation by using the installation data 116, which includes the edge-server function program P and the first information 80, and this enables acquisition of the edge server function and automatic registration of the IoT devices 18 through comparison with the second information 90, which may be acquired separately from the installation data 116. As a result, when the edge server function is installed, a series of installation operations to be performed so as to start the operation of the edge server may be more smoothly performed than in the case where a remote installation operation and an operation of registering the IoT devices 18 are separately performed.

The data collection system 10 further includes the image forming apparatus 14 (third device) that is configured to be capable of communicating with both the installation server 12 and the installation target device 36, and the image forming apparatus 14 may be configured to transfer the installation data 116 received from the installation server 12 to the installation target device 36. As a result, even if the installation server 12 and the installation target device 36 are not able to communicate with each other, the installation target device 36 may receive and acquire the installation data 116 through the image forming apparatus 14.

The installation server 12 is a server that performs pull-based communication with the image forming apparatus 14 and may transmit the installation data 116 to the installation target device 36 when the installation server 12 receives polling from the image forming apparatus 14. As a result, the processing load of the installation server 12 may be reduced more than that in the case of performing push-based communication in which information regarding installation is periodically distributed.

The first information 80 may include the device information regarding the IoT devices 18 each of which generates data that is permitted to be used, and the second information 90 may include the device information regarding the IoT devices 18 each of which is capable of communicating with the installation target device 36. As a result, through the comparison of the first information 80 and the second information 90, only the IoT device 18 from which data that is permitted to be used may be collected by communication is appropriately selected as the registration candidate device 20.

The edge-server function program P includes the one or more analysis logics L each of which uses collected data as an input and each of which uses an analysis result according to the usage purpose of the data as an output, and the first information 80 may include information items (e.g., the logic information 82 and the protocol information 84) that indicate the correspondence relationships between the types of the analysis logics L and the device information regarding the IoT devices 18 that generate input data of the analysis logics L. As a result, after completion of the installation, data collection and data analysis may be performed in a closed environment within a single device, and use of data for purposes other than the original intent is suppressed compared with the case of making a request of another device to perform the data analysis.

The second information 90 is the lease information 92 that indicates the correspondence relationship between device information and network information, and the installation target device 36 may acquire the lease information 92 from the DHCP server 34 that manages the network information in the LAN 30 where the installation target device 36 is available for use. As a result, an operator does not need to perform, on the installation target device 36, an operation of setting the device information and the network information of each of the IoT devices 18.

In addition, the installation target device 36 may perform a data collection test on the registration candidate devices 20 and may register only the registration candidate devices 20 that have passed the collection test. This reduces the probability that data will not be collected from the registered IoT devices 18 compared with the case where the registration candidate devices 20 are registered without performing the collection test.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A data collection system comprising:
   a first device that includes a generation unit configured to generate installation data including an edge-server function program for collecting data items generated by a device group including a plurality of devices and a transmission unit configured to transmit the installation data generated by the generation unit to outside; and
   a second device that includes an installation unit configured to install the edge-server function program by using the installation data transmitted from the first device,
   wherein the second device selects one or more registration candidate devices by comparing first information that is further included in the installation data and second information that is acquirable separately from the installation data and attempts to register the one or more registration candidate devices as data collection targets when installation of the edge-server function program is completed by the installation unit.

2. The data collection system according to claim 1, further comprising:
   a third device that is capable of communicating with both the first device and the second device,
   wherein the third device is configured to transfer the installation data received from the first device to the second device.

3. The data collection system according to claim 2,
   wherein the first device is a server that performs pull-based communication with the third device, and the first device transmits the installation data to the third device when the first device receives polling from the third device.

4. The data collection system according to claim 1,
   wherein the first information includes device information regarding a device that generates data that is permitted to be used, and
   wherein the second information includes device information regarding a device that is capable of communicating with the second device.

5. The data collection system according to claim 4,
   wherein the edge-server function program includes one or more analysis logics each of which uses collected data as an input and each of which uses an analysis result according to a usage purpose of the data as an output, and wherein the first information is information that indicates a correspondence relationship between types of the one or more analysis logics and the device information regarding a device that generates input data of the one or more analysis logics.

6. The data collection system according to claim 4, wherein the second information is lease information that indicates a correspondence relationship between the device information and network information, and
wherein the second device acquires the lease information from a DHCP server that manages network information in a local area network where the second device is available for use.

7. The data collection system according to claim 4, wherein the second device performs a data collection test on the registration candidate devices and registers only the registration candidate devices that have passed the collection test.

8. The data collection system according to claim 5, wherein the second device performs a data collection test on the registration candidate devices and registers only the registration candidate devices that have passed the collection test.

9. The data collection system according to claim 6, wherein the second device performs a data collection test on the registration candidate devices and registers only the registration candidate devices that have passed the collection test.

10. A data collection method comprising:
causing a first device to perform
    generating installation data that includes an edge-server function program for collecting data items generated by a device group including a plurality of devices and
    transmitting the generated installation data to outside; and
causing a second device to perform
    installing the edge-server function program by using the installation data transmitted from the first device and
    selecting one or more registration candidate devices by comparing first information that is further included in the installation data and second information that is acquirable separately from the installation data and attempting to register the one or more registration candidate devices as data collection targets upon completion of the installation of the edge-server function program.

11. A non-transitory computer readable medium storing a program causing a computer to execute a process for collecting data, the process comprising:
    generating installation data that includes an edge-server function program for collecting data items generated by a device group including a plurality of devices;
    transmitting the generated installation data to outside;
    installing the edge-server function program by using the installation data transmitted from the first device; and
    selecting one or more registration candidate devices by comparing first information that is further included in the installation data and second information that is acquirable separately from the installation data and attempting to register the one or more registration candidate devices as data collection targets upon completion of the installation of the edge-server function program.

12. An edge-functionalized device comprising:
an installation unit that installs an edge-server function program for collecting data items generated by a device group including a plurality of devices by using installation data that includes the edge-server function program,
wherein the edge-functionalized device selects one or more registration candidate devices by comparing first information that is further included in the installation data and second information that is acquirable separately from the installation data and attempts to register the one or more registration candidate devices as data collection targets when installation of the edge-server function program is completed by the installation unit.

* * * * *